(12) United States Patent
Lei

(10) Patent No.: US 12,166,594 B2
(45) Date of Patent: Dec. 10, 2024

(54) HARQ-ACK FEEDBACK FOR CONFIGURED GRANT PUSCH

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 341 days.

(21) Appl. No.: 17/622,656

(22) PCT Filed: Jul. 12, 2019

(86) PCT No.: PCT/CN2019/095736
§ 371 (c)(1),
(2) Date: Dec. 23, 2021

(87) PCT Pub. No.: WO2021/007691
PCT Pub. Date: Jan. 21, 2021

(65) Prior Publication Data
US 2022/0368475 A1    Nov. 17, 2022

(51) Int. Cl.
*H04L 1/1867* (2023.01)
*H04L 1/1607* (2023.01)
(Continued)

(52) U.S. Cl.
CPC .......... *H04L 1/1896* (2013.01); *H04L 1/1614* (2013.01); *H04L 1/1822* (2013.01); *H04L 1/1864* (2013.01); *H04L 1/1812* (2013.01)

(58) Field of Classification Search
None
See application file for complete search history.

(56) References Cited

U.S. PATENT DOCUMENTS

2019/0052414 A1\* 2/2019 Babaei .................. H04W 72/21
2020/0220663 A1\* 7/2020 Tsai ...................... H04L 1/1822
(Continued)

FOREIGN PATENT DOCUMENTS

CN       102468950 A      5/2012
CN       106888074 A      6/2017
(Continued)

OTHER PUBLICATIONS

International Searching Authority, "Written Opinion of the International Searching Authority," PCT/CN2019/095736, Apr. 8, 2020, pp. 1-4.

*Primary Examiner* — Jamaal Henson
(74) *Attorney, Agent, or Firm* — Kunzler Bean & Adamson

(57) ABSTRACT

Methods, a remote unit and a base unit are disclosed. According to one embodiment, a remote unit comprising a transceiver; a memory; and a processor coupled to the transceiver and the memory and configured to: control the transceiver to transmit, to a base unit, an indicator in an uplink control information (UCI), wherein the UCI is associated to a configured grant uplink data channel, and the indicator requests code block group (CBG)-level hybrid automatic repeat request acknowledgement (HARQ-ACK) feedback for the configured grant uplink data channel, and control the transceiver to receive, from the base unit, first downlink control information (DCI) which includes a HARQ-ACK codebook, wherein the first DCI has the same size as one uplink grant scheduling uplink data transmission, and wherein the HARQ-ACK codebook includes CBG-level HARQ-ACK feedback information bits for the configured grant uplink data channel.

20 Claims, 7 Drawing Sheets

(a)

(b)

(51) Int. Cl.
 *H04L 1/1822* (2023.01)
 *H04L 1/1829* (2023.01)
 *H04L 1/1812* (2023.01)

(56) References Cited

U.S. PATENT DOCUMENTS

2020/0221310 A1* 7/2020 Babaei .............. H04W 74/0808
2021/0314102 A1* 10/2021 Li ........................ H04L 1/1614

FOREIGN PATENT DOCUMENTS

CN 107359970 A 11/2017
WO 2018205226 A1 11/2018

* cited by examiner (a)

(b)

HARQ-ACK FEEDBACK FOR CONFIGURED GRANT PUSCH

FIELD

The subject matter disclosed herein generally relates to wireless communications and, more particularly, to code block group (CBG)-level hybrid automatic repeat request acknowledgment (HARQ-ACK) feedback for configured grant Physical Uplink Shared Channel (PUSCH).

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI), transport block (TB), Hybrid Automatic Repeat Request Acknowledgement (HARQ-ACK), Positive Acknowledgement (ACK), Negative Acknowledgement (NACK), Physical Downlink Shared Channel (PDSCH), Code Block (CB), Code Block Group (CBG), Radio Resource Control (RRC), New Data Indicator (NDI), Configured Grant (CG), Downlink Feedback Information (DFI), Listen-before-Talk (LBT), Identification (ID), Semi Persistent Scheduling (SPS), Code Block Group Transmission Information (CBGTI), Carrier Indicator Field (CIF), Autonomous Uplink (AUL), Transmission Power Control (TPC), Radio Network Temporary Identifier (RNTI), Cell-RNTI (C-RNTI), Configured Scheduling RNTI (CS-RNTI), Transmitted Precoding Matrix Indicator (TPMI), Transmission Mode (TM), Redundancy Version (RV).

The UL TB is carried on PUSCH. HARQ-ACK in this document represents collectively the ACK and the NACK. ACK means a TB is correctly received while NACK means a TB is erroneously received. A HARQ-ACK information bit value of 0 represents NACK while a HARQ-ACK information bit value of 1 represents ACK. The HARQ-ACK feedback bits corresponding to the PUSCH are transmitted in downlink control information (DCI).

In NR, besides of TB-based retransmission, CBG-based retransmission is also supported. For TB-based retransmission, one HARQ-ACK feedback bit corresponds to one TB. As long as one CB of a given TB is not correctly decoded at the receiver side, the whole TB will be reported to a "NACK". So the transmitter has to retransmit all the CBs of the TB. In case one HARQ-ACK feedback bit corresponds to one CB, gNB may know the decoding state of each transmitted CB and only retransmit the failed CBs. In this way, retransmission efficiency is the highest. However, the HARQ-ACK feedback overhead may be huge.

In order to balance the number of the needed HARQ-ACK feedback bits and the retransmission efficiency, the concept of CBG is introduced in NR Rel-15. Basically, the intention of CBG is to group several code blocks into one code block group and the resulting HARQ-ACK feedback is generated per CBG. Only all the code blocks within one CBG are correctly decoded the HARQ-ACK for the CBG may be set to "ACK"; otherwise, it is set to "NACK". Upon the reception of the HARQ-ACK feedback, only the CBG(s) with "NACK" shall be retransmitted by the transmitter.

For CBG-based retransmission, RRC signaling is used to configure the maximum number of CBGs per TB. The maximum number of CBGs per TB may be 2, 4, 6 and 8. For both semi-static HARQ-ACK codebook and dynamic HARQ-ACK codebook, the number of HARQ-ACK bits for one TB is equal to the configured maximum number of CBGs per TB, regardless of the variable TBS of a given TB.

SUMMARY

Methods and apparatuses for reducing CBG-level HARQ-ACK codebook in configured grant DFI are disclosed.

In one embodiment, a remote unit, comprises a transceiver; a memory; and a processor coupled to the transceiver and the memory and configured to: control the transceiver to transmit, to a base unit, an indicator in an uplink control information (UCI), wherein the UCI is associated to a configured grant uplink data channel, and the indicator requests code block group (CBG)-level hybrid automatic repeat request acknowledgement (HARQ-ACK) feedback for the configured grant uplink data channel, and control the transceiver to receive, from the base unit, first downlink control information (DCI) which includes a HARQ-ACK codebook, wherein the first DCI has the same size as one uplink grant scheduling uplink data transmission, and wherein the HARQ-ACK codebook includes CBG-level HARQ-ACK feedback information bits for the configured grant uplink data channel.

In another embodiment, a base unit, comprises a transceiver; a memory; and a processor coupled to the transceiver and the memory and configured to: control the transceiver to receive, from a remote unit, an indicator in an uplink control information (UCI), wherein the UCI is associated to a configured grant uplink data channel, and the indicator requests code block group (CBG)-level hybrid automatic repeat request acknowledgement (HARQ-ACK) feedback for the configured grant uplink data channel, and control the transceiver to transmit, to the remote unit, first downlink control information (DCI) which includes a HARQ-ACK codebook, wherein the first DCI has the same size as one uplink grant scheduling uplink data transmission, and wherein the HARQ-ACK codebook includes CBG-level HARQ-ACK feedback information bits for the configured grant uplink data channel.

In another embodiment, a method at a remote unit, comprises: transmitting, to a base unit, an indicator in an uplink control information (UCI), wherein the UCI is associated to a configured grant uplink data channel, and the indicator requests code block group (CBG)-level hybrid automatic repeat request acknowledgement (HARQ-ACK)

feedback for the configured grant uplink data channel, and receiving, from the base unit, first downlink control information (DCI) which includes a HARQ-ACK codebook, wherein the first DCI has the same size as one uplink grant scheduling uplink data transmission, and wherein the HARQ-ACK codebook includes CBG-level HARQ-ACK feedback information bits for the configured grant uplink data channel.

In another embodiment, a method at a base unit, comprises: receiving, from a remote unit, an indicator in an uplink control information (UCI), wherein the UCI is associated to a configured grant uplink data channel, and the indicator requests code block group (CBG)-level hybrid automatic repeat request acknowledgement (HARQ-ACK) feedback for the configured grant uplink data channel, and transmitting, to the remote unit, first downlink control information (DCI) which includes a HARQ-ACK codebook, wherein the first DCI has the same size as one uplink grant scheduling uplink data transmission, and wherein the HARQ-ACK codebook includes CBG-level HARQ-ACK feedback information bits for the configured grant uplink data channel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not, therefore, to be considered to be limiting of scope, the embodiments will be described and explained with additional specificity and detail through the use of the accompanying drawings, in which.

DETAILED DESCRIPTION

Figure 1:
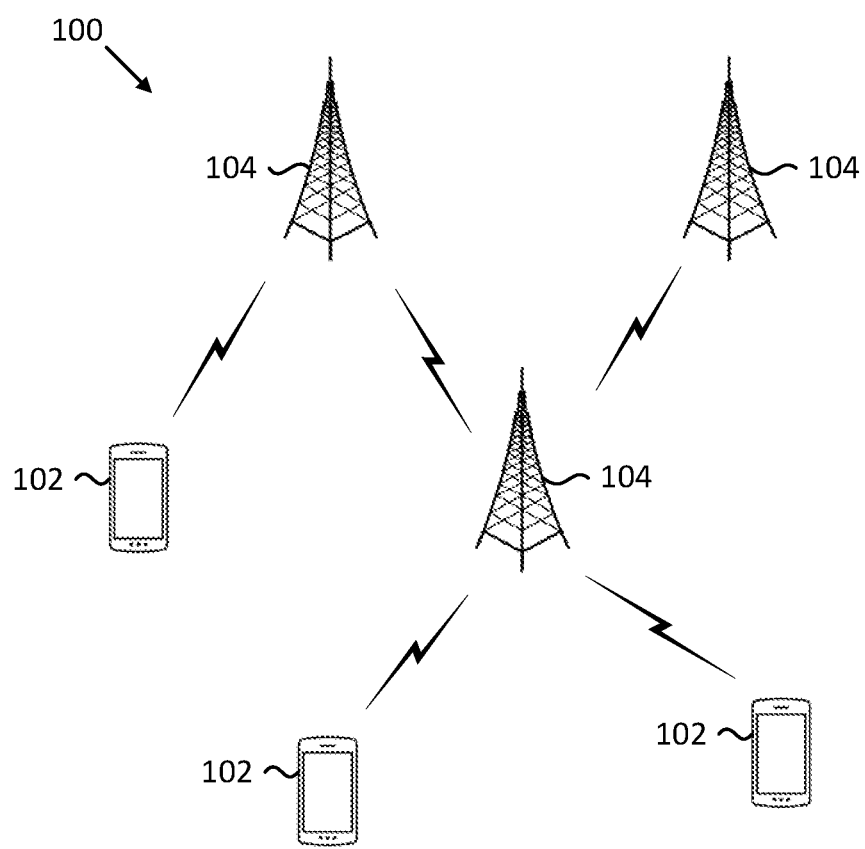
FIG. 1 is a schematic block diagram illustrating one embodiment of a wireless communication system for retransmitting uplink control information.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system".

Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, may be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that may direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

FIG. 1 depicts an embodiment of a wireless communication system 100 for CBG-based retransmission. In one embodiment, the wireless communication system 100 includes remote units 102 and base units 104. Even though a specific number of remote units 102 and base units 104 are depicted in FIG. 1, it should be noted that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, UE, user terminals, a device, or by other terminology used in the field. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the field. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the field.

In one implementation, the wireless communication system 100 is compliant with the 3GPP 5G new radio (NR). More generally, however, the wireless communication system 100 may implement some other open or proprietary communication protocol, for example, WiMAX, among other protocols.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

Figure 2:
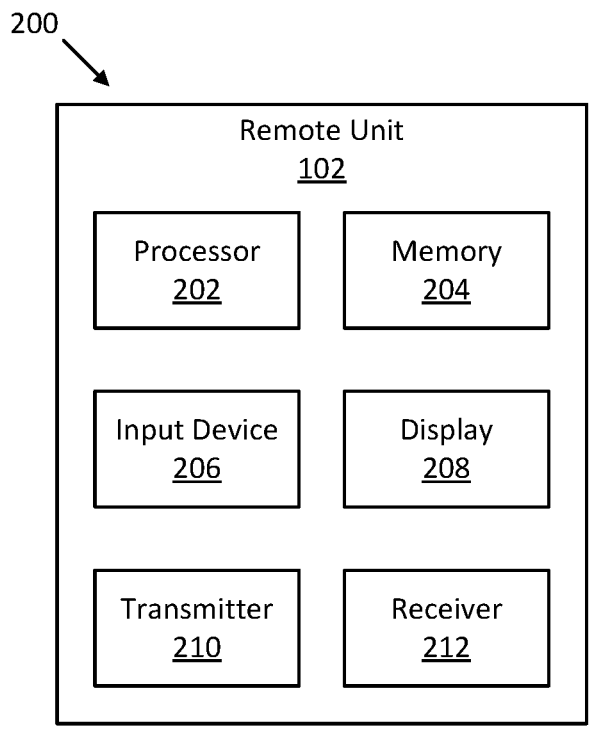
FIG. 2 is a schematic block diagram illustrating one embodiment of an apparatus that may be used for retransmitting uplink control information.

FIG. 2 depicts one embodiment of an apparatus 200 that may be used for CBG-based retransmission. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a tablet computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive the broadcast signal. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
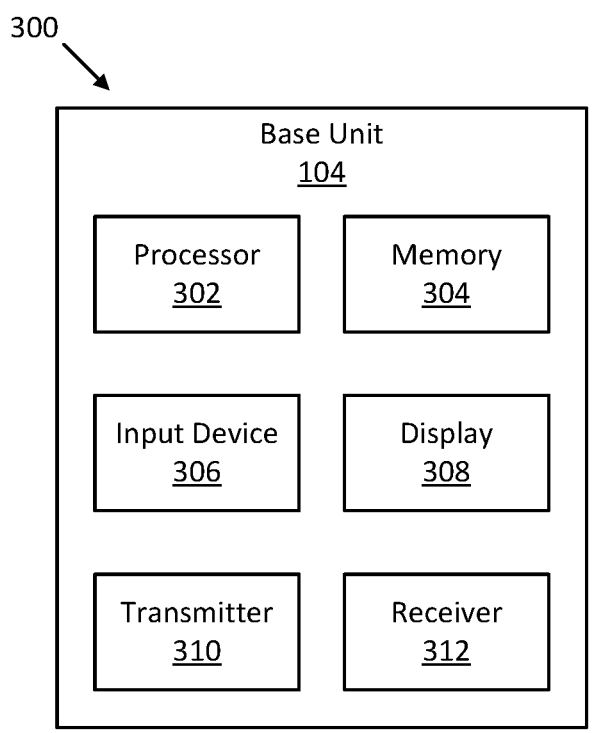
FIG. 3 is a schematic block diagram illustrating one embodiment of an apparatus that may be used for retransmitting uplink control information.

FIG. 3 depicts one embodiment of an apparatus 300 that may be used for CBG-based retransmission. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit signaling to the remote unit. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
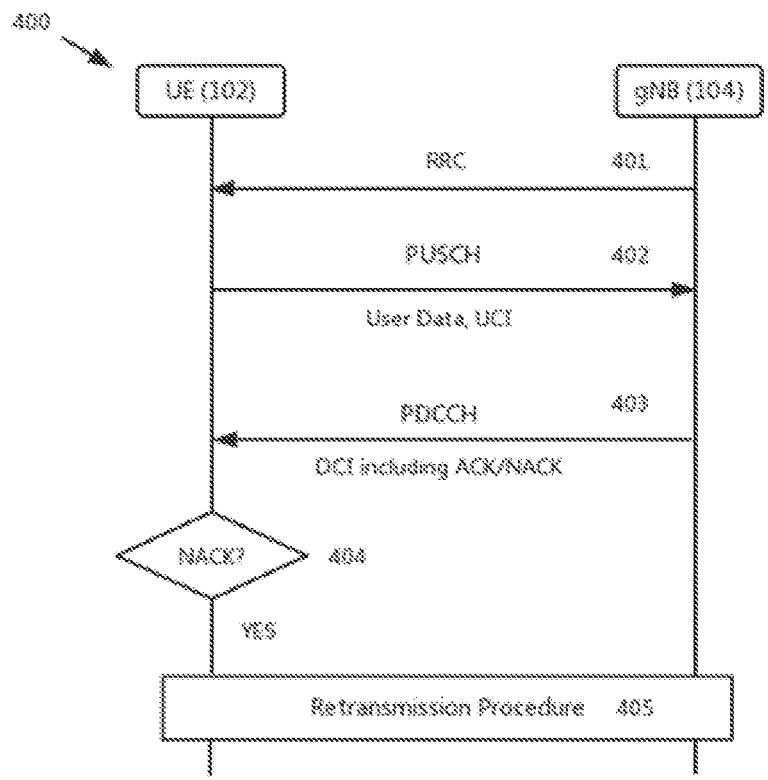
FIG. 4 is a schematic illustrating the general HARQ-ACK procedure for configured grant PUSCH.

FIG. 4 is a schematic illustrating the general HARQ-ACK procedure for configured grant PUSCH.

In general, uplink data scheduling is followed by scheduling request procedure, in which the UE transmits a SR using configured SR resources. In this scheme, however, there is an unavoidable delay due to the scheduling request step. Therefore, NR supports configured grants, whereby a PUSCH resource is configured to a UE, and the UE may transmit a PUSCH with this allocated resource when uplink data traffic arrives without performing a scheduling request procedure as shown in FIG. 4. In procedure 400, UE 102 receives RRC signaling from gNB 104 which including necessary parameters for uplink transmission (401). UE 102 transmits data and UCI on configured grant PUSCH to gNB 104 (402). Dependent on the result of decoding to the data, gNB 104 transmits ACK/NACK for the data in DCI on PDCCH (403). If the HARQ-ACK feedback indicates NACK (Yes in 404), UE 102 retransmits the data (405). Alternatively, dependent on the result of decoding to the data, gNB 104 transmits DCI on PDCCH (403) for scheduling the retransmission of the data. At UE side, upon reception of the NDI in the DCI, if the NDI is not toggled, UE 102 retransmits the data (405) in the time-frequency resource scheduled by the DCI.

In NR uplink, two schemes for configured grant transmission are supported: configured grant type 1, where an uplink grant is provided by RRC signaling, including activation of the configured grant; and configured grant type 2, where the uplink transmission periodicity is provided by RRC signaling and activation/deactivation of the configured grant as well as necessary information for transmission is provided by L1 control signaling, similar to downlink SPS. The benefits for the two schemes are similar, namely to reduce control signaling overhead and to reduce the latency to some extent since no scheduling request-UL grant cycle is needed prior to data transmission. In type 1 all the transmission parameters are set via RRC signaling, including periodicity, time offset, and frequency resources as well as MCS. Type 2 is similar to downlink SPS, i.e., RRC signaling is used to configure the periodicity, while the activation DCI provides necessary transmission parameters. The UE shall not transmit on the configured resources if the higher layers do not deliver a transport block to transmit on the resources allocated for uplink transmission without a grant. For both type 1 and type 2, gNB may configure multiple UEs with overlapping time-frequency resources in the uplink as long as the gNB may differentiate UL transmissions among the multiple UEs.

In NR, asynchronous HARQ is used in the uplink. There is no explicit HARQ ACK/NACK for PUSCH. UE may determine whether the PUSCH is successfully delivered or not based on whether it gets retransmission request from gNB or not. If gNB does not send retransmission request (i.e., DCI 0_0/0_1 with NDI not toggled) for a certain period of time, UE assumes that PUSCH is successfully received and decoded by gNB.

Figure 5:
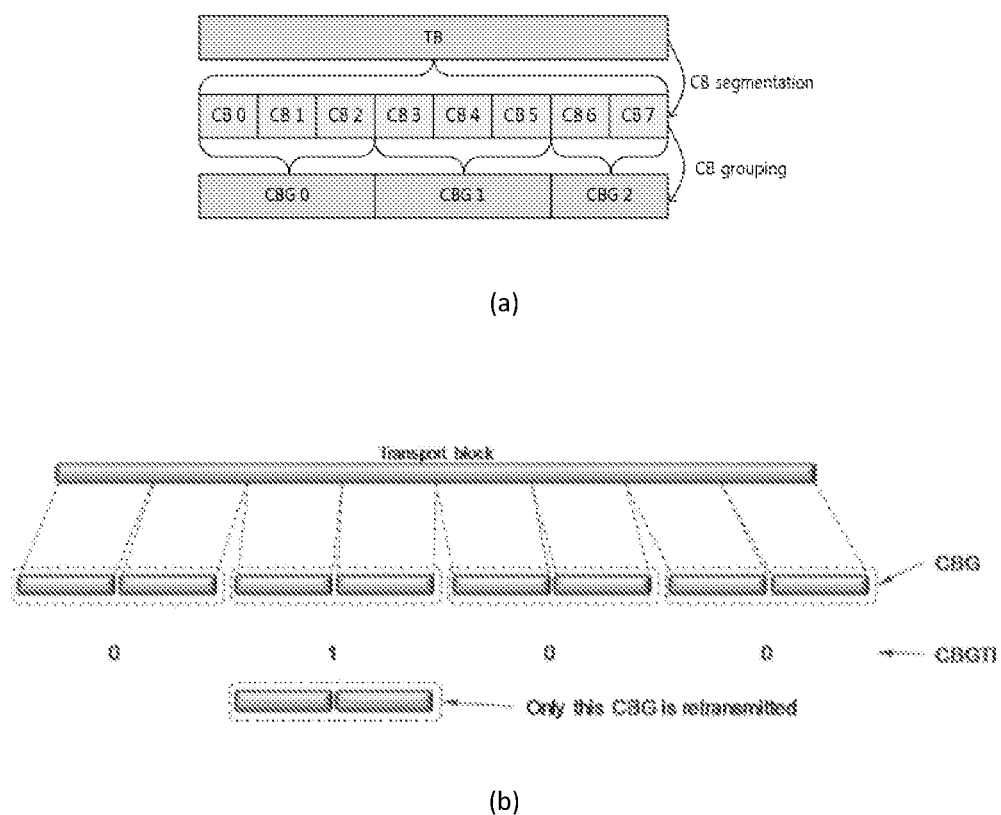
FIGS. 5 (a) and (b) are schematics illustrating the TB and CBG and CBG-level HARQ-ACK.

FIGS. 5 (a) and (b) are schematics illustrating the TB and CBG and CBG-level HARQ-ACK.

TB may be huge in size and therefore NR introduces smaller size units called code blocks (CBs) to achieve reliable transmission and reception. CBs are grouped into CBGs. Typical structure of TB is illustrated in FIG. 5 (a). One TB is segmented into multiple CBs and multiple CBs are grouped to one CBG. CBG based transmission with single or multi-bit HARQ-ACK feedback is supported, which will be described with reference to FIG. 5 (b).

The concept of CBG is introduced in NR Rel-15 for PDSCH and PUSCH transmission. Basically, the intention of CBG is to group several code blocks into one code block group and the resulting HARQ-ACK feedback is generated per CBG. Only when all the code blocks within one CBG are correctly decoded, the HARQ-ACK for the CBG may be set to "ACK"; otherwise, it is set to "NACK". Upon the reception of the HARQ-ACK feedback, only the CBG(s) with "NACK" shall be retransmitted by the transmitter. For CBG-based retransmission, RRC signaling is used to configure the maximum number of CBGs per TB. The maximum number of CBGs per TB may be 2, 4, 6 and 8. For uplink, if a UE is configured to transmit CBG-based transmissions by receiving the higher layer parameter codeBlockGroupTransmission in PUSCH-ServingCellConfig, for an initial transmission of a TB as indicated by the NDI field of the scheduling DCI, the UE may expect that the CBGTI field indicates all the CBGs of the TB are to be transmitted, and the UE shall include all the CBGs of the TB. For retransmission of a TB as indicated by the NDI field of the scheduling DCI, the UE shall include only the CBGs indicated by the CBGTI field of the scheduling DCI. A bit value of "0" in the CBGTI field indicates that the corresponding CBG is not to be transmitted and "1" indicates that it is to be transmitted as shown in FIG. 5 (b). The order of CBGTI field bits is arranged such that the CBGs are mapped in order from CBG #0 onwards starting from the most significant bit (MSB). With CBG-based retransmission, the retransmission efficiency may be increased since only failed CBG is to be retransmitted.

When NR configured grant PUSCH is transmitted over unlicensed spectrum, CBG based retransmissions are also beneficial to overcome the burst interference. Furthermore, supporting of multiple candidate transmission starting positions for one PUSCH requires data puncturing based on LBT outcome, i.e., some symbols or partial symbol shall be discarded according to when the UE finishes the LBT. In addition, subband-based LBT also requires data puncturing based on LBT outcome per LBT subband when one PUSCH is scheduled on multiple LBT subbands, i.e., one or more subbands of the scheduled subbands shall be discarded according to subband-based LBT outcome. In case the gNB receives the rest CBGs of the PUSCH correctly, the UE only needs to retransmit those punctured CBG(s) instead of the full TB. As a result, retransmission efficiency may be increased.

As mentioned above, CBG-based retransmission is supported by a UL grant. One issue is whether to support CBG-based retransmission in configured grant resource, i.e., whether UE may retransmit the failed CBGs on the configured grant resource. Technically, allowing CBG-based retransmission on configured grant resource may simplify the system design since UE may directly retransmit the CBGs which are indicated as NACK in CG-DFI and gNB does not have to perform LBT for transmitting a UL grant for scheduling retransmission. Therefore, it is beneficial to support CBG based retransmission in configured grant resource.

To enable CBG based retransmissions in configured grant, RRC signaling is used to configure the maximum number of CBGs per TB. The maximum number of CBGs per TB may be set to 2, 4, 6 or 8. The configured grant DFI transmitted by gNB to UE for indicating TB-level ACK or NACK for all HARQ processes needs to indicate CBG-level HARQ-ACK feedback information bits. The HARQ-ACK codebook in the DFI is based on HARQ-ACK bitmap for all HARQ process IDs including dynamically scheduled PUSCH and configured grant PUSCH. However, mapping CBG-level HARQ-ACK bits for all the configured HARQ processes may lead to huge HARQ-ACK codebook size. For example, when the maximum number of CBGs per TB is configured to 8 and there are 16 HARQ processes configured, the DFI needs to include 16*8=128 HARQ-ACK information bits. With the inclusion of other necessary information bits in the DFI, e.g., CIF (0 or 3 bits), AUL DFI flag (1 bit, '1' to differentiate from DCI for AUL activation/deactivation), TPC for PUSCH (2 bits), and TPMI (3 or 6 bits, only present for AUL TM2), the total payload size of configured grant DFI may be up to 140. A new DCI format may have to be introduced for configured grant DFI, which cause inevitably higher UE blind detection effort. A reasonable way is to design the configured grant DFI with the same size as one of existing UL grant formats so that UE may avoid extra blind decoding complexity. In Rel-15 NR, two UL grant formats are defined, DCI format 0_0 and format 0_1 which are used for scheduling PUSCH in one cell. It is known that both formats cannot have payload large enough to accommodate CBG-level HARQ feedback for all the configured HARQ processes. Therefore, a method for reducing the HARQ-ACK feedback overhead in DFI is needed.

Refer back to FIG. 4, CBG-based HARQ-ACK feedback for configured grant PUSCH is supported. As described above, it is desirable to configure the configured grant DFI to match with the payload size of DCI format 0_0 or 0_1 so as to avoid extra blind detection effort at UE and ensure both UE and gNB have the same understanding on the reduced HARQ-ACK codebook.

Figure 6:
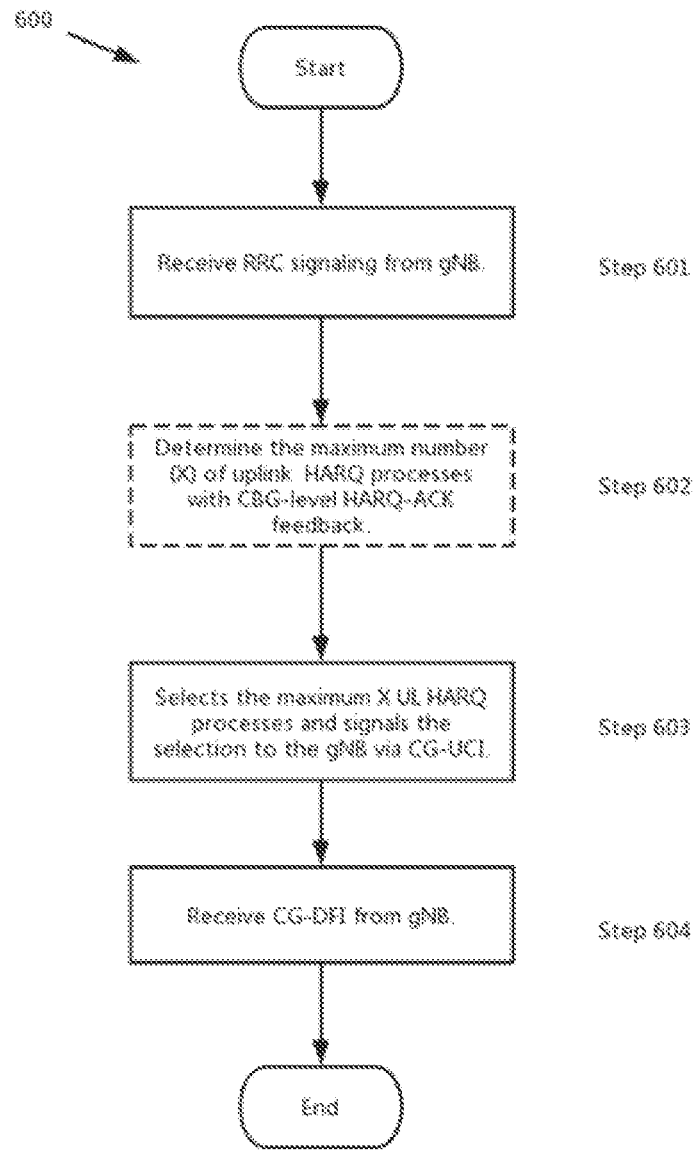
FIG. 6 is a flow chart illustrating the CBG-level HARQ-ACK procedure performed at UE according to embodiments of the invention.

FIG. 6 is a flow chart illustrating the CBG-level HARQ-ACK procedure performed at UE according to embodiments of the invention.

In this invention, several solutions are proposed for reducing CBG-level HARQ-ACK codebook in configured grant DFI so that the configured grant DFI may have the same size with existing DCI format 0_0 or 0_1. Both UE and gNB will have the same understanding of the HARQ-ACK codebook in configured grant DFI. The maximum number of uplink HARQ processes corresponding to which the UE may expect CBG-level HARQ-ACK needs to be determined for payload size alignment between CG-DFI and UL grant.

In FIG. 6, the flow 600 presents the key steps in the CBG-level HARQ-ACK procedure performed at UE. Specifically, at step 601, UE receives RRC signaling from gNB. As discussed above, for CBG-based retransmission, RRC signaling is used to configure the maximum number of CBGs per TB. In addition, the maximum number of uplink HARQ processes corresponding to which the UE may expect CBG-level HARQ-ACK information bits in CG-DFI may be configured to a UE via the RRC signaling.

According to another embodiment, instead of configuring the maximum number of uplink HARQ processes with CBG-level HARQ-ACK feedback explicitly via the RRC signaling, the maximum number may be derived implicitly by the UE. In this case, optional step 602 is performed.

The ways for gNB to configure the maximum number of uplink HARQ processes with CBG-level HARQ-ACK feedback and for UE to derive the maximum number are similar to each other. It needs to determine the CG-DFI size based on the UL grant payload size, determine the HARQ-ACK codebook size based on the CG-DFI size, and determine the maximum number of uplink HARQ processes with CBG-level HARQ-ACK feedback based on the HARQ-ACK codebook size.

The determination of the maximum number of uplink HARQ processes with CBG-level HARQ-ACK feedback is based on the payload size of the UL grant which the UE is required to monitor. This is because the CG-DFI should match the payload size of UL grant so that the UE does not need to monitor the DFI with different payload size from existing UL grant format size.

The payload size of DCI format 0_0 is dependent on the bandwidth of the current active UL BWP or initial UL BWP and the size of DCI format 1_0 since both formats should always have same payload size. The payload size of DCI format 0_1 is dependent on the specific RRC configuration since most of the fields in DCI format 0_1 are configurable. Regarding the size alignment between CG-DFI and the UL grant, according to one embodiment, CG-DFI is designed only aligned with DCI format 0_1, so the maximum number of uplink HARQ processes with CBG-level HARQ-ACK feedback is only based on the DCI format 0_1. In another embodiment, two CG-DFI formats are designed, one is aligned with DCI format 0_0 and another is aligned with DCI format 0_1. Therefore, two maximum number of uplink HARQ processes with CBG-level HARQ-ACK feedback are configured, one based on the DCI format 0_0 and another based on the DCI format 0_1. In this case, UE needs to monitor two CG-DFI formats in a candidate CG-DFI monitoring occasion. The two CG-DFI formats have the same size as DCI format 0_0 and 0_1 with different RNTI, respectively. DCI format 0_0 and 0_1 use C-RNTI while CG-DFI uses CS-RNTI.

Figure 8:
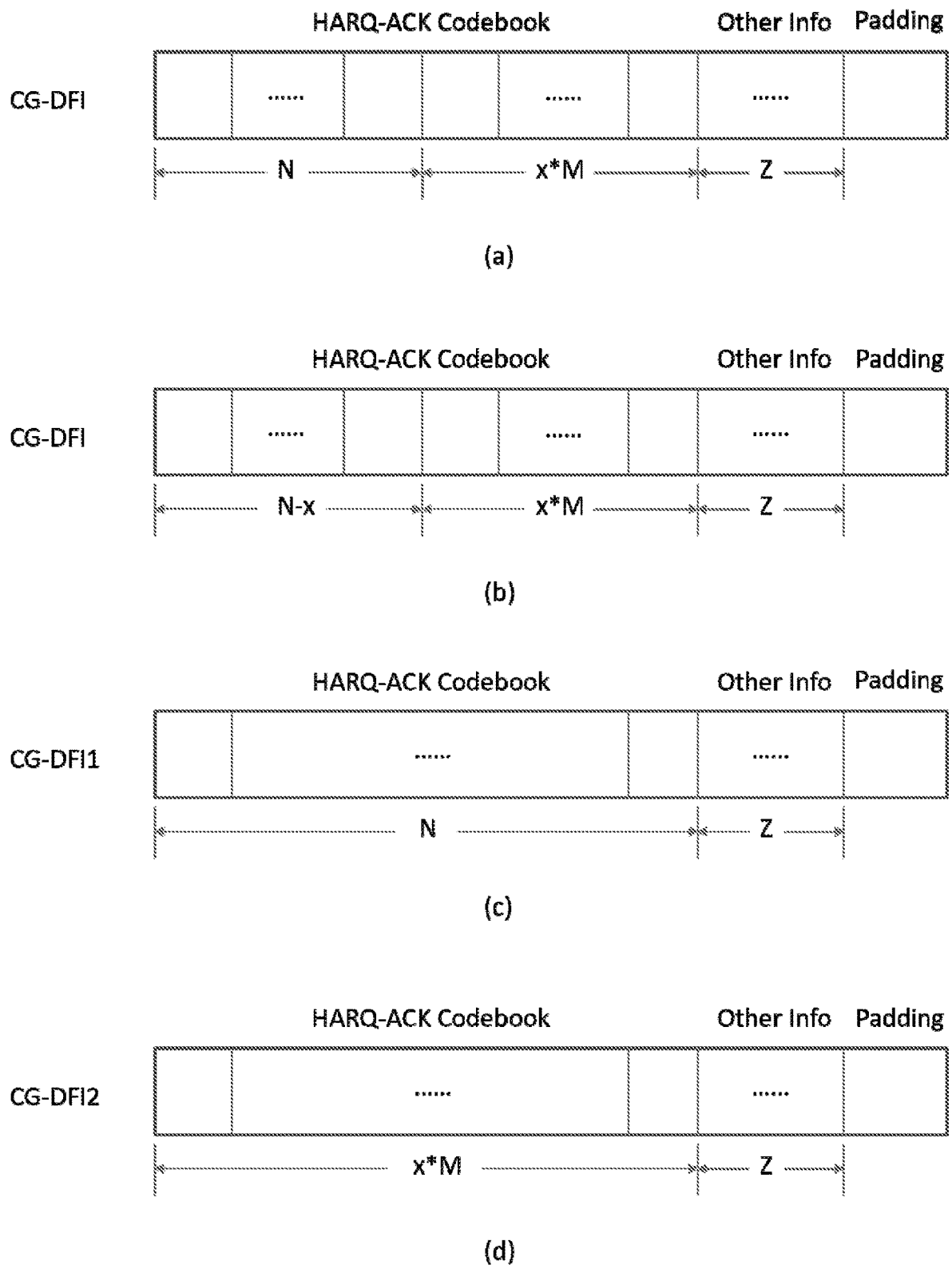
FIGS. 8 (a)-(d) are schematics illustrating the maximum number of uplink HARQ processes with CBG-level HARQ-ACK feedback according to the embodiments of the invention.

In this description, several solutions to determine the maximum number of uplink HARQ processes with CBG-level HARQ-ACK feedback in CG-DFI, denoted as X for simplicity, are proposed with reference to FIG. 8.

FIGS. 8 (a)-(d) are schematics illustrating the maximum number of uplink HARQ processes with CBG-level HARQ-ACK feedback according to the embodiments of the invention.

According to solution 1, for the HARQ-ACK codebook in the CG-DFI, all the UL HARQ processes are acknowledged with TB-level HARQ-ACK information bits firstly, then there are x UL HARQ processes which may be acknowledged with CBG-level HARQ-ACK information bits. This solution is illustrated in FIG. 8 (a). As shown, the CG-DFI comprises HARQ-ACK codebook and other necessary information. And zero padding or NACK padding may be needed if the payload size of the CG-DFI is smaller than that of DCI format 0_0 or 0_1. The maximum number of uplink HARQ processes with CBG-level HARQ-ACK feedback in CG-DFI, X, is the largest x satisfying the below in equation (1).

$$N+x*M+Z<=Y \qquad (1)$$

Wherein, M is the maximum number of CBGs per TB configured in RRC signaling, N is the number of UL HARQ processes, Z is the number of other necessary information bits in the CG-DFI except for HARQ-ACK codebook (e.g., CIF, AUL DFI flag, TPC for PUSCH, TPMI, or other information bits), and Y is the payload size of DCI format 0_0 or 0_1.

In solution 1, N UL HARQ processes are acknowledged with TB-level HARQ-ACK information bits and x of the N UL HARQ processes are acknowledged with CBG-level HARQ-ACK information bits, where x<=X.

According to solution 2, for the HARQ-ACK codebook in the CG-DFI, the x uplink HARQ processes are acknowledged with CBG-level HARQ-ACK information bits and the remaining N-x HARQ processes are acknowledged with TB-level HARQ-ACK information bits. This solution is illustrated in FIG. 8 (b). In this case, the in equation (1) may be rewritten as in equation (2).

$$x*M+(N-x)+Z<=Y, \text{ i.e., } x*(M-1)+N+Z<=Y \qquad (2)$$

According to the both solutions, one CG-DFI is used, which comprises TB-level HARQ-ACK feedback and CBG-level HARQ-ACK feedback.

Accords to solution 3, two CG-DFIs (CG-DFI1 and CG-DFI2) are used. CG-DFI1 comprises TB-level HARQ-ACK feedback for all the uplink HARQ processes and other necessary information, e.g., CIF, CG-DFI flag, TPC for PUSCH, TPMI, and so on. CG-DFI2 comprises CBG-level HARQ-ACK feedback for maximum X uplink HARQ processes. The two CG-DFI formats have the same payload size as the UL grant so as to reduce UE blind detection effort. One or two flag bits are needed in the content of CG-DFI1 and CG-DFI2 to differentiate the CG-DFI1, CG-DFI2 and UL grant. This solution is illustrated in FIGS. 8 (c) and (d).

For the HARQ-ACK codebook in the CG-DFI2, assuming there are x UL HARQ processes which may be acknowledged with CBG-level HARQ-ACK information bits, the value of X is the largest x satisfying in equation (3).

$$x*M+Z<=Y, x<=N, \qquad (3)$$

For solutions 1 and 2, the CG-DFI may use a different number of CRC bits (e.g., 16-bit CRC) compared to 24-bit CRC used for DCI format 0_0 or 0_1. In this case, the CG-DFI size alignment should take the difference of CRC bit lengths into account such that the CG-DFI and the UL grant have the same total number of information bits plus CRC bits.

For solution 3, the CG-DFI1 and CG-DFI2 may use a different number of CRC bits (e.g., 16-bit CRC) compared to 24-bit CRC used for DCI format 0_0 or 0_1. In this case, size alignment should take the difference of CRC bit lengths into account such that the CG-DFI1 and CG-DFI2 and the UL grant have the same total number of information bits plus CRC bits.

These three solutions may be used by the gNB to explicitly configure the maximum number of uplink HARQ processes with CBG-level HARQ-ACK feedback to the UE via RRC signaling (step 601), or may be used by the UE to implicitly derive the maximum number (step 602).

Refer back to FIG. 6, after determining the maximum number of uplink HARQ processes with CBG-level HARQ-ACK feedback explicitly or implicitly, at step 603, the UE may select up to X UL HARQ processes to be acknowledged with CBG-level HARQ-ACK feedback and signal the selection to the gNB.

For solutions 1 and 2 described above with reference to FIGS. 8 (a) and (b), the UE may select up to X UL HARQ processes based on several criteria and send new signaling to the gNB so that the gNB shall transmit CBG-level HARQ-ACK information bits in CG-DFI for those UE selected UL HARQ processes instead of all UL HARQ processes. The UE should ensure the number of selected UL HARQ processes does not exceed the maximum number of uplink HARQ processes with CBG-level HARQ-ACK feedback determined at step 601 or step 602.

The criteria for UE to select the UL HARQ processes with CBG-level HARQ-ACK feedback may satisfy one or more of the following.

(1) The HARQ process which is transmitted in the first slot or first several slots of an uplink burst acquired by UE by performing Category 4 LBT;

(2) The HARQ process which is punctured for UCI piggyback;

(3) The HARQ process where the corresponding PUSCH may have multiple candidates starting positions and be punctured based on the LBT outcome;

(4) The HARQ process where the corresponding PUSCH may be configured on multiple LBT subbands and be punctured based on the individual LBT outcome of each LBT subband;

(5) The HARQ process for the priority class of data where low latency and high reliability are required;

(6) The HARQ process which is used by configured grant PUSCH.

For solution 3 described above with reference to FIGS. 8 (c) and (d), the UE may select up to X UL HARQ processes and signal the corresponding selection to the gNB so that the gNB shall transmit CBG-level HARQ-ACK information bits in CG-DFI2 for those UE selected UL HARQ processes instead of all UL HARQ processes. In this case, the criteria for UE to select the UL HARQ processes with CBG-level HARQ-ACK feedback may be the same as the previous (1)-(6).

Alternatively, for solution 3, the first or last X UL HARQ processes of all the UL HARQ processes are acknowledged with CBG-level HARQ-ACK feedback in CG-DFI2, or the first or last X UL HARQ processes with "NACK" indicated in CG-DFI1 are acknowledged with CBG-level HARQ-ACK feedback in CG-DFI2.

Only CG-PUSCH needs to be indicated the CBG-level HARQ-ACK information bits in CG-DFI. In contrast, for those dynamically scheduled PUSCH by DCI format 0_0 or 0_1, the CBG-based retransmission is only scheduled by DCI format 0_0 or 0_1, i.e., does not occur on the configured grant resources. The DCI format 0_0 or 0_1 includes CBGTI for CBG-based retransmission. So there is no need to indicate CBG-level HARQ-ACK information bits in CG-DFI for dynamically scheduled HARQ process.

Still at step 603, after the selection of the X HARQ process, UE needs to inform the selection to gNB. Regarding the signaling for UE to inform gNB of the selected UL HARQ processes for CBG-level HARQ-ACK feedback, in one embodiment, one-bit indicator in CG-UCI carried on the configured grant PUSCH is used to request CBG-level HARQ-ACK feedback for the corresponding UL HARQ process. For example, the indicator with value "1" indicates CBG-level HARQ-ACK feedback is requested; the indicator with value "0" indicates TB-level HARQ-ACK feedback is requested.

Since CG-UCI includes the specific HARQ process ID, NDI and RV, gNB and UE know the HARQ process should be acknowledged with CBG-level HARQ-ACK feedback when the one-bit indicator in CG-UCI is enabled, and the HARQ process is acknowledged with TB-level HARQ-ACK feedback when the one-bit indicator in CG-UCI is disabled.

With respect to the signaling transmitted to gNB from UE, CBGTI is included in CG-UCI to indicate gNB which CBG(s) is retransmitted in associated configured grant PUSCH. Furthermore, NDI in CG-UCI is non-toggled indicating the configured grant PUSCH is for retransmission of a TB. NDI is toggled indicating the configured grant PUSCH is for initial transmission of a TB. With the indication of NDI, both UE and gNB may know the current transmitted TB is an initial transmission or retransmission.

At step 604, for solution 1 and 2, UE receives CG-DFI from gNB. The CG-DFI is in the same size as DCI format 0_0 or 0_1. The CG-DFI comprises HARQ-ACK codebook which includes CBG-level HARQ-ACK feedback for the HARQ process selected by UE. Correspondingly, for solution 3, UE receives CG-DFI1 and CG-DFI2 from gNB. The CG-DFI1 and CG-DFI2 are in the same size as DCI format 0_0 or 0_1. The CG-DFI1 comprises the HARQ-ACK codebook with TB-level HARQ-ACK information bits for all the UL HARQ processes, and CG-DFI2 comprises the HARQ-ACK codebook with CBG-level HARQ-ACK information bits for the maximum X UL HARQ processes.

The procedure of determining the HARQ-ACK codebook in CG-DFI by gNB will be described with reference to FIG. 7.

Figure 7:
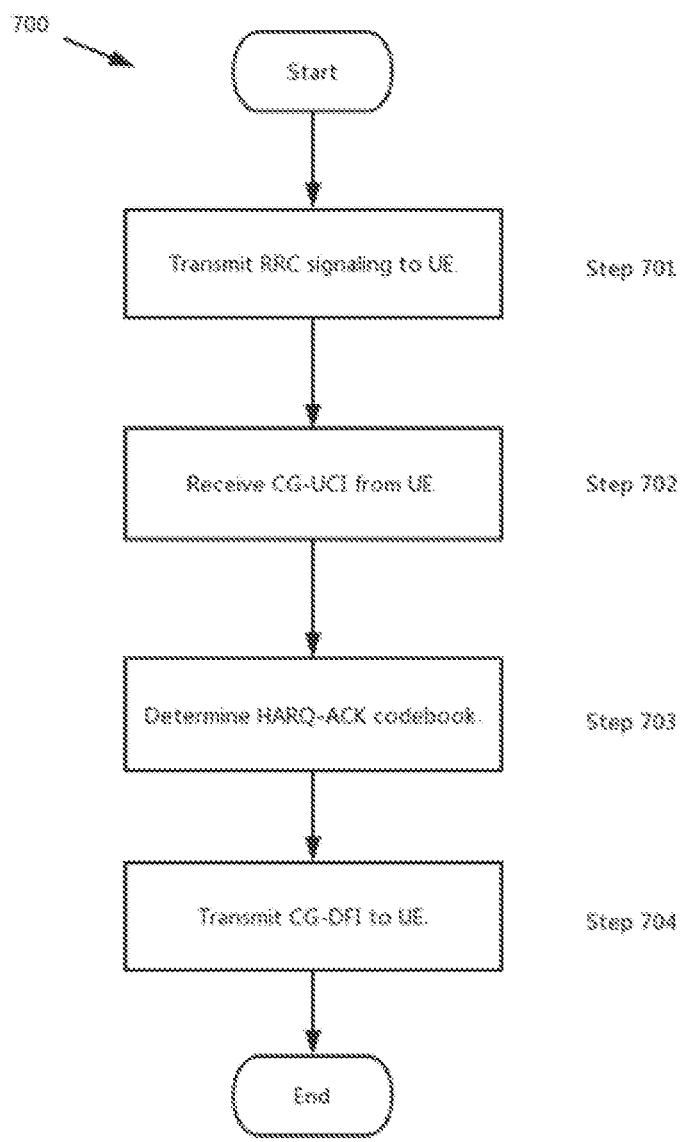
FIG. 7 is a flow chart illustrating the CBG-level HARQ-ACK procedure performed at gNB according to embodiments of the invention.

FIG. 7 is a flow chart illustrating the CBG-level HARQ-ACK procedure performed at gNB according to embodiments of the invention.

In FIG. 7, the flow 700 presents the key steps in the CBG-level HARQ-ACK procedure performed at gNB. Specifically, at step 701, gNB transmits RRC signaling to UE. As discussed above, for CBG-based retransmission, RRC signaling is used to configure the maximum number of CBGs per TB. In addition, the maximum number of uplink HARQ processes corresponding to which the UE may expect CBG-level HARQ-ACK information bits in CG-DFI may be configured to a UE via the RRC signaling. The solutions for gNB to determine the maximum number of uplink HARQ processes with CBG-level HARQ-ACK feedback has been described with respect to steps 601 and 602.

According to another embodiment, instead of configuring the maximum number of uplink HARQ processes with CBG-level HARQ-ACK feedback explicitly via the RRC signaling, the maximum number may be derived implicitly by the UE. In this case, the information on the maximum number of uplink HARQ processes with CBG-level HARQ-ACK feedback is not included in the RRC signaling at step 701.

At step 702, gNB receives CG-UCI from UE. The selection of the X UL HARQ processes to be acknowledged with CBG-level HARQ-ACK feedback by UE will be informed to gNB with the CG-UCI. The selection procedure has been described with respect to step 603.

At step 703, the gNB determines the HARQ-ACK codebook in CG-DFI. Specifically, for solutions 1 and 2, HARQ-ACK codebook in CG-DFI is determined as below.

For the HARQ process scheduled by DCI format 0_0 or 0_1, only TB-based HARQ-ACK information bits are transmitted in CG-DFI.

For the HARQ process not used for configured grant PUSCH, only TB-based HARQ-ACK information bits are transmitted in CG-DFI. This may avoid the error case when DCI format 0_0 or 0_1 scheduling PUSCH on a certain HARQ process is missed by UE. In this case, one-bit NACK is mapped for the HARQ process.

For the HARQ process used for configured grant PUSCH while not selected by UE for CBG-level HARQ-ACK feedback, only TB-based HARQ-ACK information bits are transmitted in CG-DFI.

For the HARQ process used for configured grant PUSCH and selected by UE for CBG-level HARQ-ACK feedback, CBG-level HARQ-ACK information bits are transmitted in CG-DFI.

The payload size of CG-DFI is determined firstly based on DCI format 0_0 or 0_1, then the value of X is determined based on CG-DFI. Furthermore, the HARQ-ACK codebook size in CG-DFI is determined based on the value of X. In case UE selects n UL HARQ processes for CBG-level HARQ-ACK feedback in CG-DFI, where n<X, zero padding or NACK padding are needed in CG-DFI in order to match CG-DFI size to the DCI format 0_0 or 0_1. For example, (X-n)*M padding bits are needed in CG-DFI, wherein the M is the maximum number of CBGs per TB configured in RRC signaling.

For solution 3, HARQ-ACK codebook in CG-DFI is determined as below.

Only TB-based HARQ-ACK information bits for all UL HARQ processes are transmitted in CG-DFI1.

For the HARQ process used for configured grant PUSCH and selected by UE for CBG-level HARQ-ACK feedback, CBG-level HARQ-ACK information bits are transmitted in CG-DFI2.

In case UE selects n UL HARQ processes for CBG-level HARQ-ACK feedback in CG-DFI2, where n<X, zero padding or NACK padding are needed in CG-DFI2 in order to match CG-DFI2 size to the DCI format 0_0 or 0_1. For example, (X-n)*M padding bits are needed in CG-DFI2, wherein M is the maximum number of CBGs per TB configured in RRC signaling.

The order of HARQ-ACK codebook in CG-DFI should be known for both UE and gNB. Specifically, for solutions 1 and 2, HARQ-ACK codebook in CG-DFI is ordered according to the HARQ process IDs.

In one embodiment, the HARQ-ACK codebook comprises two parts: a first part which includes TB-level HARQ-ACK information bits for all the UL HARQ processes; and a second part which includes CBG-level HARQ-ACK information bits for those up to X UE selected UL HARQ processes. Both parts are ordered according to the UL HARQ process IDs separately.

In another embodiment, the HARQ-ACK codebook comprises two parts: a first part which includes TB-level HARQ-ACK information bits for at least N-X UL HARQ processes; and a second part which includes CBG-level HARQ-ACK information bits for those at most X UE selected UL HARQ processes. Both parts are ordered according to the HARQ process IDs separately.

In a third embodiment, the HARQ-ACK codebook comprises TB-level HARQ-ACK information bits for at least N-X UL HARQ processes and CBG-level HARQ-ACK information bits for at most X UL HARQ processes, wherein N is the number of UL HARQ processes. TB-level HARQ-ACK information bits and CBG-level HARQ-ACK information bits are concatenated in the order of UL HARQ process IDs.

For solution 3, since CG-DFI1 which comprising TB-level HARQ-ACK information bits only and CG-DFI2 which comprising CBG-level HARQ-ACK information bits only are transmitted separately, HARQ-ACK codebook in CG-DFI1 and CG-DFI2 may be ordered according to HARQ process IDs separately.

At step 704, for solution 1 and 2, gNB transmits CG-DFI to UE. The CG-DFI is in the same size as DCI format 0_0 or 0_1. The CG-DFI comprises the determined HARQ-ACK codebook which includes CBG-level HARQ-ACK feedback for the HARQ process selected by UE. Correspondingly, for solution 3, gNB transmits CG-DFI1 and CG-DFI2 to UE. The CG-DFI1 and CG-DFI2 are in the same size as DCI format 0_0 or 0_1. The CG-DFI1 comprises the HARQ-ACK codebook with TB-level HARQ-ACK information bits for all the UL HARQ processes, and CG-DFI2 comprises the HARQ-ACK codebook with CBG-level HARQ-ACK information bits for the maximum X UL HARQ processes. With the configuration disclosed in the description, the configured grant DFI may have the same size with existing DCI format 0_0 or 0_1 and both UE and gNB may have the same understanding on the HARQ-ACK codebook in configured grant DFI.

It should be noted that the steps described above are not all necessary. It is possible to perform only some of these steps. The order of steps is also not mandatory but may be performed in other orders or in parallel. The execution of some steps requires signaling. The collective signaling described in the specification as being used for multiple steps may be replaced with separate signaling for individual step.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

With the disclosure described in the invention, the maximum number of UL HARQ processes which may be acknowledged with CBG-level HARQ-ACK feedback is explicitly configured via RRC signaling. Alternatively, the maximum number of UL HARQ processes which may be acknowledged with CBG-level HARQ-ACK feedback is implicitly derived by UE. Three solutions with different in equations are proposed to determine the maximum number of UL HARQ processes with CBG-level HARQ-ACK feedback. UE may select the UL HARQ processes which expect CBG-level HARQ-ACK feedback. Six criteria for the selection are provided. One bit in CG-UCI is used as an indicator to request CBG-level HARQ-ACK feedback in CG-DFI for the corresponding UL HARQ process. The methods to determine the HARQ-ACK codebook in CG-DFI are provided.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
transmit, to a base station, an indicator in an uplink control information (UCI), wherein the UCI is associated with a configured grant uplink data channel, and the indicator requests code block group (CBG)-level hybrid automatic repeat request acknowledgement (HARQ-ACK) feedback for the configured grant uplink data channel;
determine a maximum number of uplink HARQ processes which can be acknowledged with CBG-level HARQ-ACK feedback based on a size of an uplink grant scheduling uplink data transmission; and
receive, from the base station, first downlink control information (DCI) which includes a HARQ-ACK codebook, wherein the first DCI has the same size as the uplink grant, and the HARQ-ACK codebook includes CBG-level HARQ-ACK feedback information bits for the configured grant uplink data channel.

2. The UE of claim 1, wherein the at least one processor is configured to cause the UE to receive a radio resource control (RRC) signaling from the base station indicating a maximum number of uplink HARQ processes which can be acknowledged with CBG-level HARQ-ACK feedback in the first DCI.

3. The UE of claim 2, wherein the HARQ-ACK codebook comprises two parts: a first part which includes TB-level HARQ-ACK information bits for N uplink HARQ processes; and a second part which includes the CBG-level HARQ-ACK information bits for X uplink HARQ processes, wherein N is a total number of uplink HARQ processes, and X is the maximum number of uplink HARQ processes with CBG-level HARQ-ACK feedback.

4. The UE claim 2, wherein the HARQ-ACK codebook comprises two parts: a first part which includes TB-level HARQ-ACK information bits for N-X uplink HARQ processes; and a second part which includes the CBG-level HARQ-ACK information bits for X uplink HARQ processes, wherein N is a total number of uplink HARQ processes, and X is the maximum number of uplink HARQ processes with CBG-level HARQ-ACK feedback.

5. The UE of claim 2, wherein the HARQ-ACK codebook comprises TB-level HARQ-ACK information bits for N-X uplink HARQ processes and the CBG-level HARQ-ACK information bits for X uplink HARQ processes, wherein N is a total number of uplink HARQ processes, X is the maximum number of uplink HARQ processes with CBG-level HARQ-ACK feedback, and the TB-level HARQ-ACK information bits and the CBG-level HARQ-ACK information bits are concatenated in an order of uplink HARQ process IDs.

6. The UE of claim 2, wherein the HARQ-ACK codebook comprises CBG-level HARQ-ACK information bits for X uplink HARQ processes, and X is the maximum number of uplink HARQ processes with CBG-level HARQ-ACK feedback.

7. The UE of claim 2, wherein the uplink HARQ processes with CBG-level HARQ-ACK feedback are used for configured grant uplink transmissions.

8. The UE of claim 2, wherein the at least one processor is configured to cause the UE to select up to X uplink HARQ processes with CBG-level HARQ-ACK feedback from all uplink HARQ processes and set the indicator in the UCI corresponding to each of up to X uplink HARQ processes, and X is the maximum number of uplink HARQ processes which can be acknowledged with CBG-level HARQ-ACK feedback in the first DCI.

9. The UE of claim 8, wherein the UE is configured with a plurality of criteria used for selecting up to X uplink HARQ processes with CBG-level HARQ-ACK feedback.

10. The UE of claim 1, wherein the maximum number of uplink HARQ processes with CBG-level HARQ-ACK feedback is determined as the largest x satisfying a condition, $N+x*M+Z<=Y$, and, M is maximum number of CBGs per transport block (TB) configured by RRC signaling, N is a total number of uplink HARQ processes, Z is a number of other necessary information bits in the first DCI except for the HARQ-ACK codebook, and Y is the size of the uplink grant.

11. The UE of claim 1, wherein the maximum number of uplink HARQ processes with CBG-level HARQ-ACK feedback is determined as the largest x satisfying a condition, $x*M+(N-x)+Z<=Y$, and, M is maximum number of CBGs per TB configured by RRC signaling, N is a total number of uplink HARQ processes, Z is a number of other necessary information bits in the first DCI except for the HARQ-ACK codebook, and Y is the size of the uplink grant.

12. The UE of claim 1, wherein the maximum number of uplink HARQ processes with CBG-level HARQ-ACK feedback is determined as the largest x satisfying a condition, $x*M+Z<=Y$, and, $x<=N$, N is a total number of uplink HARQ processes, M is maximum number of CBGs per TB configured by RRC signaling, Z is a number of other necessary information bits in the first DCI except for the HARQ-ACK codebook, and Y is the size of the uplink grant.

13. The UE of claim 1, wherein the UCI includes a field indicating HARQ process number for the configured grant uplink data channel and the indicator in the UCI requests CBG-level HARQ-ACK feedback for the HARQ process number.

14. The UE of claim 1, wherein the at least one processor is configured to cause the UE to receive, from the base station, second downlink control information (DCI) which includes TB-level HARQ-ACK feedback for all uplink HARQ processes, and the second DCI has the same size as the uplink grant.

15. The UE of claim 14, wherein a field for differentiating the first DCI and the second DCI is included in the first DCI and the second DCI.

16. The UE of claim 14, wherein the first DCI includes only CBG-level HARQ-ACK feedback for uplink data transmissions.

17. The UE of claim 1, wherein the UCI further includes code block group transmission information (CBGTI) indicating CBGs transmitted on the configured grant uplink data channel.

18. A base station, comprising:
at least one memory; and
at least one processor coupled with the at least one memory and configured to cause the base station to:
receive, from a user equipment (UE), an indicator in an uplink control information (UCI), wherein the UCI is associated to a configured grant uplink data channel, and the indicator requests code block group (CBG)-level hybrid automatic repeat request acknowledgement (HARQ-ACK) feedback for the configured grant uplink data channel;
determine a maximum number of uplink HARQ processes which can be acknowledged with CBG-level HARQ-ACK feedback based on a size of an uplink grant scheduling uplink data transmission; and
transmit, to the UE, first downlink control information (DCI) which includes a HARQ-ACK codebook, wherein the first DCI has the same size as the uplink grant, and the HARQ-ACK codebook includes CBG-level HARQ-ACK feedback information bits for the configured grant uplink data channel.

19. A method performed by a user equipment (UE), the method comprising:
transmitting, to a base station, an indicator in an uplink control information (UCI), wherein the UCI is associated with a configured grant uplink data channel, and the indicator requests code block group (CBG)-level hybrid automatic repeat request acknowledgement (HARQ-ACK) feedback for the configured grant uplink data channel;
determining a maximum number of uplink HARQ processes which can be acknowledged with CBG-level HARQ-ACK feedback based on a size of an uplink grant scheduling uplink data transmission; and
receiving, from the base station, first downlink control information (DCI) which includes a HARQ-ACK codebook, wherein the first DCI has the same size as the uplink grant, and the HARQ-ACK codebook includes CBG-level HARQ-ACK feedback information bits for the configured grant uplink data channel.

20. A method performed by a base station, comprising:
receiving, from a user equipment (UE), an indicator in an uplink control information (UCI), wherein the UCI is associated with a configured grant uplink data channel, and the indicator requests code block group (CBG)-level hybrid automatic repeat request acknowledgement (HARQ-ACK) feedback for the configured grant uplink data channel;
determining a maximum number of uplink HARQ processes which can be acknowledged with CBG-level HARQ-ACK feedback based on a size of an uplink grant scheduling uplink data transmission; and
transmitting, to the UE, first downlink control information (DCI) which includes a HARQ-ACK codebook, wherein the first DCI has the same size as the uplink grant, and the HARQ-ACK codebook includes CBG-level HARQ-ACK feedback information bits for the configured grant uplink data channel.

* * * * *